(No Model.) 2 Sheets—Sheet 1.
E. P. ROBBINS.
UNDERGROUND ELECTRIC CONDUIT.
No. 469,723. Patented Mar. 1, 1892.
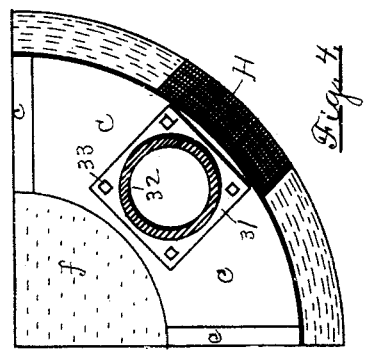
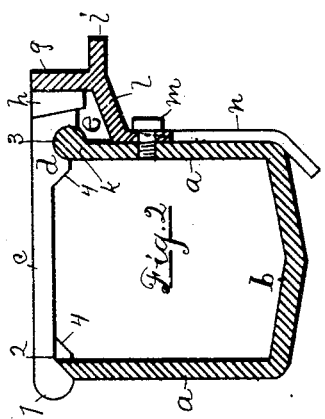
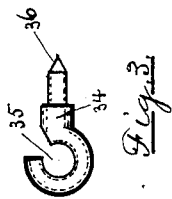
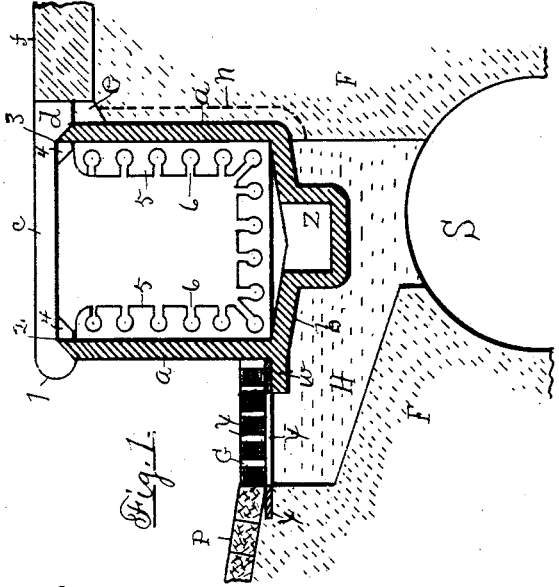
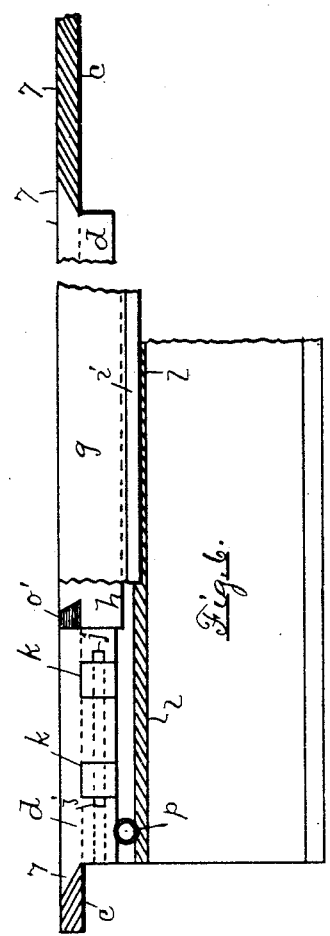
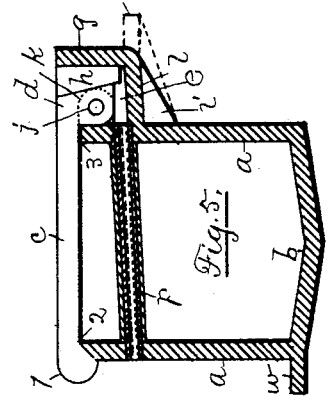
Witnesses,
Inventor,
Edward P. Robbins, M.E.

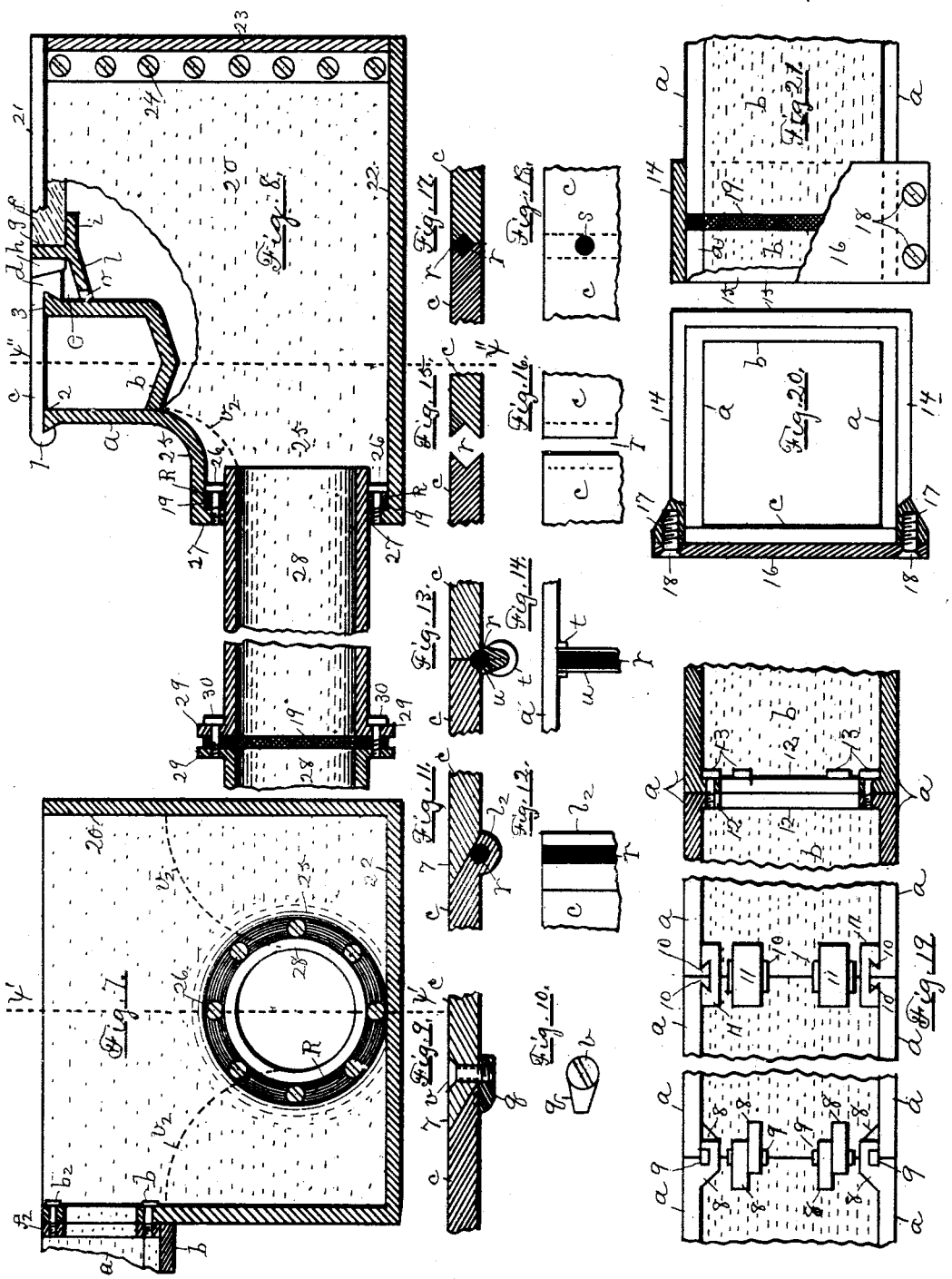

UNITED STATES PATENT OFFICE.

EDWARD P. ROBBINS, OF CINCINNATI, OHIO.

UNDERGROUND ELECTRIC CONDUIT.

SPECIFICATION forming part of Letters Patent No. 469,723, dated March 1, 1892.

Application filed February 24, 1890. Serial No. 341,612. (No model.)

*To all whom it may concern:*

Be it known that I, EDWARD P. ROBBINS, a citizen of the United States, residing at Cincinnati, in the county of Hamilton and State of Ohio, have invented certain new and useful Improvements in Underground Electric-Conductor Conduits; and I do hereby declare the following to be a full, clear, and exact description of the invention, such as will enable others skilled in the art to which it appertains to make and use the same.

My invention relates to improvements in underground electric-conductor conduits, and especially to hollow-curb conduits and accessories.

The object of my invention is to devise an underground conduit for electrical conductors and the accessory devices used in conjunction therewith which will be simple and inexpensive of construction, generally applicable to all kinds of roadways and gutters, convenient to place and of access, and which shall have the best possible provision for preventing the admission of water in any manner to the interior of the conduit.

Figure 1 is a cross-sectional view of my conduit, the gutter, roadway, catch-basin, and sewer connection. Figs. 2 and 5 show constructions of modifications of conduits. Fig. 3 shows a wire-support. Fig. 4 is a plan of a street corner, showing my curb, a lamp or other post base, the gutter, and the catch-basin. Fig. 6 is a back side view of the conduit constructed, as shown in Fig. 5. Fig. 7 is a sectional view of a vault or work-chamber for workmen along the plane $x''$ $x''$, Fig. 8, and an end view of a cross-street pipe joined thereto. Fig. 8 is a mid-sectional view of the latter along the plane $x'$ $x'$, Fig. 7. Figs. 9, &c., including Fig. 18, show details of construction relating to the conduit-cover. Fig. 19 shows modifications of joints between contiguous conduit-sections. Fig. 20 is an end view, and Fig. 21 a plan view in line with the views in Fig. 19 of an expansion-joint for the conduit.

The same letters and numbers refer to the same parts in different figures.

The essential features of my improved conduit are a trough of rectangular cross-section open at top and designed with special reference to be cast in metal from patterns easily drawn from the molds, an external formation especially adapted for combining and constructing therewith the pavement and gutter and posts for lamps or conductor-supports or for other purposes, a cover for the conduit adapted to close snugly and water-tight the top opening of the conduit and to be conveniently opened and closed or removed and replaced, and also simple, inexpensive, practicable, and efficient means for making cross connections under the roadway between conduits on opposite sides of the street.

$a$ are the sides, $b$ the bottom, and $c$ the cover, of the trough. The bottom $b$ may be plain, as in Fig. 19, or depressed, as in Figs. 1, 2, 5, and 8. The bottom is depressed in order that any moisture which may form by condensation or may leak into the conduit may collect in the bottom and be separated from any conductor-supports within the conduit and may be drained along the bottom of the conduit to suitable exits or places of collection.

$z$, Fig. 1, is a pocket formed in the bottom of the conduit for collecting drain-water. That water may be removed by hand occasionally, or a pipe may be led from its bottom to a sewer when arranged so that it cannot become obstructed or filled with backwater. When the conduit is situated so that backwater rises above the bottom of the conduit, it is preferable to employ a siphon to discharge the water, as next described.

Any suitable means may be employed for supporting, separating, and insulating the conductors placed within my conduit. Since the number and size of conductors are subject to variation and change, it is believed preferable to provide a conduit in which any kind of conductor-supports and insulation may be arranged and which will be convenient of access at all points without interference with the pavement or street traffic. The greatest number of separate conductors can be best placed or removed independently when arranged adjacent the sides and bottom of the conduit with a free space in the middle.

5, Fig 1, shows my construction of a removable conductor-support to be made, as shown, of wood or of insulating material, as glass. When made of wood, a U-shaped piece 5 is produced and holes 6 are bored around the inner edge, and then narrow gaps are cut through to the holes with a saw, thus forming a conductor-support for a number of conductors from a single piece of board and having holes with contracted openings, whereby the conductors are secured against vertical and horizontal displacement. When made of glass or similar material, the supports 5 would be molded of the form shown. The bottom of the support 5 being straight and that of the conduit depressed, a passage is left under it for the passage of drain-water, as seen in Fig. 1. Such blocks may be placed at any convenient distance apart and simply rest within the conduit.

Screw-eyes 34, Fig. 3, may be screwed into the walls of the conduit at any suitable place as means for supporting and directing the conductors. Such eyes have contracted openings 35, for the purpose mentioned above, relative to the eyes 6 in Fig. 1. The screw-eyes 34 may be turned in any direction to suit any direction taken by the conductors. The screws 36 could be screwed into the iron walls $a$ and $b$, but that method would require holes to be drilled in the walls, which would be expensive, and it would not be convenient to adjust them.

The parts 34 are made of insulating material and the screws 36 of metal. The insulating material 34 may be cast onto the heads of manufactured wood-screws.

In order to provide a conduit which will exclude water from all sides, the conduit proper is made with integral bottom and sides and with a top or cover having overhanging or downwardly-projecting edges and shaped to direct overhead water downward exteriorly of the conduit. That provision may be had for turning overhead water outward and downward the top edges of the side walls $a$ are beveled exteriorly downward and the edges of the cover are beveled interiorly to correspond and fit to the bevels of the side walls. The edges of the cover may project downward any desired amount to insure the downward passage of the water. The outer edge 1 may be made thick and round for strength, beauty, and protection against injury from vehicles. The said bevels may be made as shown in Figs. 1, 2, and 5, or as in Fig. 8. In Figs. 1, 2, and 5 the bevels are inclined downward and outwardly, while in Fig. 8 they are inclined downward inwardly.

One essential and new feature of this invention is the means provided for securing the cover $c$ snugly and positively in place by simple means, which is convenient for use and not liable to become damaged or impaired by the external contact with anything which may rub or knock against the cover of the conduit and which will not be rendered useless by rust. Various modifications of such means will be set forth. The simplest means of the kind is shown in Fig. 1, where the walls $a$ and cover $c$ are beveled, as described, and the back edge of the cover $c$ has an enlarged or thick part or ledge $d$, with a plain top surface even with the upper surface of the top $c$ and the pavement-stone $f$ and has a vertical surface against which the outer surface of the pavement-stone $f$ or any intervening parts abut and where the ledge $d$ extends downward below the upper edge 3 of the wall $a$ sufficiently to form a wedge-block between the wall-edge 3 and the pavement-stone $f$ and to form a cover for a trough $e$ between the wall $a$ and the pavement-stone $f$, in which the water that leaks through the joint between the ledge $d$ and the stone $f$ may collect and drain along the back side of the conduit-wall $a$, and thus be conducted away from the joint between the cover $c$ and the wall $a$. The dotted position of a pipe $n$ or other passage is shown in Fig. 1 leading from the trough $e$ to the sewer S. The weight of the cover $c$ and the beveled shape of its joints with the walls $a$ will keep the cover $c$ of Fig. 1 in place and the joint between the ledge $d$ and the pavement-stone $f$ tight, so that dirt and gravel cannot fill up the trough $e$, and hence any water which leaks into the trough $e$ will never be obstructed in its passage to the sewer. Lugs 4 may be cast to the cover $c$ as additional means of retaining the cover securely in place and also of preventing any external horizontal pressure from pressing the top edges of the walls $a$ together.

The elementary construction shown in Fig. 1 is further perfected by the construction and modification shown in Figs. 5 and 6, Fig. 7 being a back view of the hinge parts shown in Fig. 5. There the ledge $d$ is cut out for the reception of the eyes $k$, which are cast integral with and exterior to the top ledge 3 of the wall $a$. The parts $d$ and $a$ are secured together by means of the eyes $k$ and pins $j$, and the ledge $d$ is made to extend down over the edge 3 of the wall $a$, as in Fig. 1. Here the back wall $a$ has an integral extension $l\,g$, forming a trough $e$ beneath the ledge $d$, and the part $g$ is intended to extend vertically between the top of the conduit and the outer edge of the pavement-stone $f$ and have its upper surface even with the top of the pavement. The outer edge or surface of the ledge $d$ here is beveled to form a wedge-shaped space between it and the extension $g$, in which a bar $h$, having a wedge-shaped cross-section, is driven and secured. When all the parts mentioned are in the position shown in Fig. 5, the wedge $h$ keys the cover $c$ securely in place, and its outward lateral pressure against the adjacent surface of the ledge $d$ causes the edge 1 of the cover to press tightly upon the top edge of the wall $a$, and thus hold snugly to that edge of the conduit. The pins $j$ may be inserted in holes at the ends of the ledges $d$, as indicated by dotted lines in Fig. 6.

In Fig. 1 the cover $c$ is removed by raising it vertically, and when removed may be placed with its side upon the pavement $f$ adjacent the groove $e$, the side of the ledge $d$ being made wide enough for a base, by which the cover may be supported edgewise or vertically, and thus be out of the way of persons operating in the conduit and of pedestrians and also serving to keep water out of the conduit in case of heavy rains. When the space between the edge 3 of the wall $a$ and the pavement-stone $f$ is wide enough, the ledge $d$ can be set in the trough $e$ and its back rest against the edge of the pavement-stone $f$.

In Fig. 5 the wedge $h$ is removed by prying it out of place in any suitable manner. Holes $o'$, Fig. 6, in the ends of the wedges enable some device to be inserted therein for raising the wedge. The wedge $h$ would be laid upon the pavement $f$ adjacent the trough $e$ and then the cover turned about its hinges until its top surface rests against the edge of the extension $g$, where it rests. In this modification a pipe $p$ is shown passing through the upper portion of the conduit as means for conducting water from the trough $e$ to the gutter G. The pipe $p$ may be expanded or otherwise made water-tight at its ends, and is preferably made of non-corrosive metal and thin. By placing a thick iron pipe around the pipe $p$, as shown, and making its ends abut against the inner walls of the conduit, the said pipe may serve to prevent external horizontal pressure from forcing the walls $a$ together. Conductors may be placed above and below such pipes without material interference. The extension $l$ may have cast integral therewith a ledge $i$, as indicated by dotted lines, to form a seat for the outer edge of the pavement-stone $f$, and which will serve to keep the upper surface of all of the parts in one plane. A ledge $w$ may be cast integral with the outer wall $a$ of the conduit, as shown in Figs. 1 and 5, upon which the gutter-stone may be laid, and upon which the catch-basin grating $x$ may be supported, as shown in Fig. 1. The vertical sides of the conduit and the ledges $w$ and $i$ enable the conduit to be easily and conveniently constructed in connection with the pavement and gutter in a manner such that the conduit will not be displaced by lateral stresses and that the said parts will always retain a proper relative position. The ledge $w$ may be placed at any desired place on the side of the conduit to correspond to the depth of the conduit or gutter.

It is evident that any of the modifications of conduits described may be conveniently cast from patterns which are drawn parallel to the vertical axis of the conduit.

In Fig. 2 another modification of conduit is shown, where the hinge is formed by enlarging and rounding the edge 3 of the inner wall $a$ and forming a corresponding round bottom groove in the under side of the back edge of the cover $c$ or the ledge $d$. The cover here is designed to be opened by being lifted vertically, as that in Fig. 1, or by being rotated about its hinges, as that shown in Fig. 5. The arrangement and operation of the extension $g$ and the wedge $h$ is the same here as in Fig. 5; but the extension $l$ is made separate and attached to the back side of the conduit by a flange and bolts $m$. A passage $n$—as a pipe—may communicate with a hole in the bottom of the trough $e$, as seen in Fig. 8 at $o$, and conduct water thence to a sewer. Lugs 4 may be used on the cover here, as in Fig. 1.

In Fig. 8 the cover $c$ is shown beveled at both side edges and the top edges 2 and 3 of the walls $a$ beveled exteriorly and inward, so as to form dovetailed joints for securing the cover firmly to the conduit. The outer surface of the ledge $d$ is made wedge-shaped to correspond to the wedge $h$ used in connection therewith.

The conduit proper is to be made in sections of convenient and suitable length and with the sections suitably connected together at their ends, so as to make a continuous water-tight conduit.

Various ways are known for uniting the ends of pipes and tubes which may be employed. However, I have devised special means for that purpose. One special feature of this invention is that all joints of the curb-conduit proper are secured by fastening means, which is protected by the conduit itself from external sources of injury which could affect the said fastenings. All bolts and other means for securing joints are placed interiorly and so as to be reached from the inside of the conduit, and hence will not rust nor get out of repair. In the plan view of Fig. 19 three different ways of joining conduit-sections end to end are shown. $a$ are the sides and $b$ the bottoms of the conduits. Interlocking means are shown in two views and bolts and flanges in the third. Side views of such means are shown on the sides $a$ of the conduit, and face views are shown on the bottom $b$ of the conduit. At the left 8 are lugs cast interiorly to the ends of the conduit-sections, with openings which come opposite when the sections are placed end to end, and pins 9 are driven through the said openings, which confine the sections together. By making the surfaces wedge shape and the pins wedge shape and having the holes overlap, the sections may be drawn tightly together.

10 are wedge-shaped lugs cast to the interior of the section-walls $a$ at their ends, and 11 are clamps or notched blocks which can be driven over the lugs 10 of the opposite ends of the sections when they are placed end to end, and thus be made to clamp the sections together.

12 are internal flanges on the ends of contiguous sections, and 13 are bolts by which the said flanges, and hence the sections, are connected together.

Special provision may be made at desired points in the line of the conduit proper for the expansion and contraction of the metal of the conduit.

I have devised a simple and inexpensive means for accommodating expansion, and which is shown in Figs. 20 and 21, Fig. 20 being an end view, and Fig. 21 a plan, partly in section, and the top being placed toward the bottom of the drawing-sheet. All portions of the conduit need not have depressed bottoms, as shown in Fig. 1, since water confined in any portion can be led away through a passage communicating with the portion depressed. Hence any two contiguous conduit-sections may be made rectangular in cross-section, as shown in Figs. 20 and 21. There adjacent sections are shown placed slightly apart, and a short box-section 14 15 is shown embracing the ends of the sections in a manner permitting the sections ends to play freely endwise therein. A top plate 16 is secured to the sides 14 by means of screws 18, having countersunk heads, which prevent their being obstructions or being injured by external means. The box 14 15 16 may be secured permanently in the masonry of the pavement, so as not to be displaced endwise. Elastic packing 19 may be placed within the space between the ends of the adjacent sections to exclude water. The ends 7 of the covers $c$ of contiguous conduit-sections may have any suitable means for preventing the ingress of water. I have shown several modifications of such means, which I have invented. The simplest means is where the ends of one section-cover are beveled downward inwardly and those of the other section-cover are beveled downward outwardly, so that an inclined contact-surface is afforded at the end joint, as shown in Fig. 6. Suitable packing material, as water-proof cloth, pitch, &c., may be used at such joints to prevent the passage of water. Fig. 9 is a sectional view of one modification of such means. Fig. 10 is a plan view of the button shown in Fig. 9. There a button $q$ is attached by a pin or screw $v$ to the under side of the end of one cover $c$, and may be turned exteriorly by the slotted head of the pin, so as to clamp the contiguous ends of the covers $c$ together or free them. Packing may be used between the inclined surfaces here also.

Fig. 11 is a sectional view, and Fig. 12 a plan, of another modification of such means. One cover $c$ has cross-ledges $l^2$ cast integral with its end, that has a groove in its upper surface for holding packing material $r$, as a cord saturated with water-proof material.

Fig. 13 is a sectional view, and Fig. 14 a plan, of another modification of such means. There a bar $u$ is supported at its ends in lugs $t$, cast on the sides of the walls $a$, and has a groove in its upper surface, in which is secured packing $r$, and the ends of the covers $c$ are cut away at their under contiguous edges to form a recess for a portion of the packing $r$, while their ends abut and protect the packing.

Fig. 15 is a sectional view, and Fig. 16 a plan, of another modification of such means, where a groove is cut in the opposing edges of adjacent covers $c$ to form an intervening recess open at the top and bottom, in which packing may be placed or in which a pin or stick may be driven and held to close the joint.

Fig. 17 is a sectional view, and Fig. 18 a plan, of another modification of such means, and where a groove is formed between the opposing ends of contiguous covers in a manner to be closed above and below and in which such material as lead or pitch, &c., may be made to seal the joint. The lead may be poured into the end of the groove or into holes $s$.

Fig. 4 shows a curved conduit-section for corners. The sides and bottom of such a section may be made continuous and integral and the top made of a single circular part or of short sectors.

31, Fig. 4, is the base of a hollow post having its bottom formed to connect with the cover $c$ of the conduit, and is shown bolted in place to the conduit-body by means of bolts 33. 32 is the hollow post through which electrical conductors may be led from the curb-conduit to any desired elevation for connection with overhead conductors for lighting, railway use, or other purposes. Such posts may be similarly connected to and supported by my curb-conduit at any desired place along the curb.

In view of the fact that catch-basins are usually placed at corners, as shown in Fig. 4 at H, and that street-car tracks curve around those corners in all directions, it is believed that it is most practicable to locate cross-conduits under the roadway at a little distance from the corners, and where connections can be made with straight portions of the curb-conduit. It is also desirable to be able to so construct such cross-conduits that they may not cause any interference with traffic on the roadway when conductors are to be placed or removed or when the conduit requires repairs. To these ends I have devised the arrangements and constructions next described.

Figs. 7 and 8 show a work-chamber of rectangular shape, which is adapted to be cast and fitted in place conveniently in the line of the curb-conduit and at the place where the underground cross-conduit is located. 20 are the ends of the chamber to which the ends of the curb-conduit are connected. The curb-conduits may be joined to the chamber-walls in any suitable manner which will provide water-tight joints. A preferable method is shown in Figs. 7 and 8, where the conduit $a$ $b$ $c$ has its outer wall flush and continuous with the outer side wall of the work-chamber and its cover $c$ level with the top 21 of the work-chamber, the end of the curb-conduit being joined to the wall 20 of the chamber by flanges $f^2$ and bolts $b^2$ and interiorly. The side 23 of the chamber is removable and secured in place by bolts 24 and interior flanges. The cover 21 may be left loose or secured in any suitable manner and may be made as shown or with overhanging edges. The side of the chamber adjacent the gutter is formed with an outwardly-extending prolongation 25, terminating in a tubular part, to which the underground cross-conduit is designed to connect. The cross-conduit is made circular in cross-section and preferably of pipes placed end to end. Metal or earthen pipes may be employed in such positions, or arched brick-work can be used. I prefer the arrangement invented by myself and shown in the drawings. There the cross-conduit is made of iron pipes of suitable length, one or more sections being used, according to the length of the conduit. Two sections will be sufficient for streets of ordinary width.

Two cylindrical sections 28 are shown connected together at the middle of the street by exterior end flanges 29 and bolts 30. Packing material 19 is placed between the flanges to form a tight joint. The flanges 29 and bolts 30 are placed exteriorly here in order that the pipes may be made of the smallest internal diameter and be entirely smooth from end to end, and thus not interfere with the passage of conductors through it from side to side of the street and because such conduits will not be disturbed and can have the flanges 29 and bolts 30 covered and protected by cement or other water-proof covering.

In order to provide for longitudinal expansion and contraction of the pipes 28 and to provide the simplest and least expensive method of joining the cross-conductor with the curb-conduits, I interpose the chamber 20 25 and connect the said conduits thereto and in such a manner that the conductors may be led in easy curved lines from any direction into and through the cross-conduits. The chamber-extension 25 terminates in a short tube having an end flange 27, and the end of the pipe 28 is made smooth and cylindrical that it may snugly fit within the hole of the flange 27. Packing 19 is placed around the end of the pipe 28 and secured in place by the ring R and bolts 26. Such a construction between the chamber and the cross-conduits makes a simple tight joint having provision for the variation of length of the pipe 28, and at the same time providing capacity for keeping all parts in line and well connected without being under strains due to uneven settling of the earth or portions of the pavement or roadway.

The chamber 20 25 serves as a connecting means for the curb-conduit and cross-conduit and also for a space for workmen to stand or have access to when working with conductors which pass under the street.

The dotted lines $v^2$, Figs. 7 and 8, indicate the inner curves, around which conductors can be bent when placing them in position within the connected curb-conduits, chambers, and cross-conduits.

The screw-eyes 34, Fig. 3, are especially serviceable in directing and holding the conductors where they must be curved, as indicated by the dotted lines $v^2$ in Figs. 7 and 8, since they can be turned axially into any position and thus have the conductor pull against the closed side of the eye 35. Since any desired number may be used, any degree of curvature can readily be provided.

The construction and arrangement of curb conduits and accessories above described affords the most complete, perfect, and inexpensive means for protecting underground electrical conduits practicable.

Provision is had for working with the conductors in the conduit without interference with travel on the pavement or the roadway, and where the operator can stand in the gutter with the cover of the conduit on the opposite side, and serving as means to keep away pedestrians and also keep out the rain-water which collects on the pavement, also for draining any water which may leak into the conduit and for securing the conduit-cover positively in place by simple means not capable of being damaged by the elements.

I claim—

1. The conductor-conduit consisting of a trough of rectangular cross-section, in combination with a cover, the top edges of the sides being beveled exteriorly and downwardly and outwardly and the cover having its edges projecting exterior to the outer surface of the sides and beveled to fit the bevels of the sides and the inner cover edge being enlarged or thickened exterior to the surface of the side and having a plain exterior surface, substantially as set forth.

2. The conductor-conduit consisting of a trough of rectangular cross-section, a cover having its edges projecting exterior to the top edges of the sides and overlapping the latter and having its inner edge enlarged and extended inwardly toward the pavement and having a plain exterior side surface adjacent the pavement, in combination with the pavement top, substantially as set forth.

3. The conductor-conduit consisting of the trough of rectangular cross-section, in combination with a cover having its edges projecting exterior to the top edges of the sides and overlapping the latter and having its inner edge enlarged and extending inwardly toward the pavement and having a plain exterior side surface adjacent the pavement and having hinged parts formed therein, the inner side edge having hinge parts also, whereby the cover is hinged to the top edge of the inner conduit side, substantially as set forth.

4. The combination of the conductor-conduit having a rectangular cross-section, a cover having overlapping side edges and the inner side edge enlarged and extended inwardly toward the pavement, and having a plain exterior side surface adjacent the pavement, the pavement top, and a tightening block or bar interposed between the plain side of the cover edge and the pavement top, substantially as set forth.

5. The combination of the conductor-conduit having a rectangular cross-section, a cover having overlapping side edges and the inner side edge enlarged and extended inwardly toward the pavement and having a plain exterior side surface adjacent the pavement, the pavement top, and a water passage or receptacle beneath the enlarged side edge of the cover and adjacent the inner conduit side and the pavement top, substantially as set forth.

6. The combination of the conductor-conduit having a rectangular cross-section, a cover having overlapping side edges and the inner side edge enlarged and extended inwardly toward the pavement and having a plain exterior side surface adjacent the pavement, the pavement top, a vertical ledge or partition supported at its base by the inner conduit side and having its top edge flush with the top of the conduit-cover and the pavement and including a water-passage between its base and the adjacent conduit side, and a tightening block or bar interposed between the plain side of the cover-edge and the said vertical ledge, the pavement top being in contact with the outer side of the said vertical ledge, substantially as set forth.

7. The combination of the conductor-conduit having a rectangular cross-section, a cover having overlapping side edges and the inner edge enlarged and extended inwardly toward the pavement and having a plain exterior side surface adjacent the pavement, the pavement top, a vertical ledge or partition supported at its base by the inner conduit side and having its top edge flush with the top of the conduit-cover and the pavement and including a water-passage between its base and the adjacent conduit side, and a wedge-shaped tightening block or bar interposed between the plain side of the cover-edge and the said vertical ledge, the top of the conduit-cover of the vertical ledge of the said block and of the pavement constituting a continuous pavement-surface, substantially as set forth.

8. The combination of a conductor-conduit, a contiguous pavement, a water passage or receptacle beneath the pavement-surface and adjacent the back side of the conduit, and an outlet-passage leading from the said receptacle and discharging below the conduit, substantially as set forth.

9. The combination of a conductor-conduit, a contiguous pavement, a water passage or receptacle beneath the pavement-surface and adjacent the back side of the conduit, and a pipe-outlet communicating with the said receptacle and extending through the conduit interior, substantially as set forth.

10. The combination of a conductor-conduit, a contiguous pavement, a water passage or receptacle beneath the pavement surface and adjacent the back side of the conduit, a pipe-outlet communicating with the said receptacle and extending through the conduit interior, and a tube encircling and supporting the said pipe and serving as a compression-brace for the sides of the conduit, substantially as set forth.

11. A conductor-conduit composed of similar sections joined end to end and having the abutting sections connected together by keying devices formed interiorly on the abutting ends of the sections, each section end having lugs arranged contiguous to corresponding lugs on the other section and the contiguous lugs being connected and held together by removable keying devices, substantially as set forth.

12. A conductor-conduit composed of similar sections joined end to end and having the abutting sections connected together by keying devices formed interiorly on the abutting ends of the sections, each section end having lugs arranged contiguous to corresponding lugs on the other section, and the contiguous lugs being connected and held together by removable keying devices having inclined contact and bearing-surfaces adapted to bind the said contiguous lugs together, substantially as set forth.

13. A conductor-conduit composed of similar sections joined end to end and having the abutting sections connected together by keying devices arranged to draw the parts tightly together, as by inclined surfaces, substantially as set forth.

14. A conductor-conduit composed of similar sections joined end to end and having covers joined end to end, and means, substantially as set forth, for making tight end joints for the covers.

15. A conductor-conduit composed of similar sections joined end to end and having covers joined end to end and packing or sealing material confined, substantially as described, between the abutting ends of the covers.

16. A conductor-conduit composed of similar sections joined end to end and having covers joined end to end and having their ends beveled at the joints and arranged to lap upon each other, in combination with packing or sealing material confined between the inclined surfaces of their ends, substantially as set forth.

17. The combination of a conductor-conduit forming a curb, an underground cross-conduit under the roadway composed of piping, an intervening box or chamber with which the said conduits connect and communicate and having a rectangular horizontal area or cross-section, perpendicular sides to which the curb-conduits connect, and a side prolongation adjacent its bottom and in the outer side and having a terminal formation adapted to form a lateral joint with the said cross-conduit.

18. The combination of a conductor-conduit forming a curb, an underground cross-conduit under the roadway composed of piping, and an intervening box or chamber with which the said conduits connect and communicate, the said box or chamber being cast in shape and having a removable cover and a removable side adjacent the buildings, and the main casting of the chamber having a rectangular horizontal top cross-section and a rectangular vertical cross-section and a conical or contracted outwardly-extending side prolongation with a terminal circular opening and an adjacent flange and the end of the cross-conduit being held within and secured by the said prolongation and flange, substantially as set forth.

19. The combination of a conductor-conduit forming a curb, an underground cross-conduit under the roadway composed of piping, and an intervening box or chamber with which the said conduits connect and communicate, the said box or chamber being cast of the shape described and having top and rear openings and covers therefor and having a conical or contracted outwardly-extending side prolongation with a terminal circular opening and an adjacent flange, the end of the cross-conduit pipe being held loosely and packed water-tight within the said opening by means of packing and a confining-ring and bolts, substantially as set forth.

20. The combination of a conductor-conduit forming a curb, an underground cross-conduit under the roadway, and an intervening box or chamber constructed substantially as described and to which the said conduits connect and communicate, the said cross-conduit being formed of similar sections of straight pipes connected end to end by means of external flanges and bolts and intervening packing material, and the free ends of the said pipes being loosely secured by packed joints to the box or chamber at the sides of the roadway, substantially as set forth.

21. A curb conductor-conduit having a cover suitably secured thereto, in combination with a hollow post or column attached to and supported by the said conduit, the said hollow post serving as a vertical conduit and support for conductors, substantially as set forth.

22. The combination of the conductor-conduit and conductor-supports arranged therein and of the kind described and having eyes with contracted openings and made of insulating material, substantially as set forth.

In testimony whereof I now affix my signature in presence of two witnesses.

EDWARD P. ROBBINS.

Witnesses:
HENRY BAER, Jr.,
JOHN GARLICK.